United States Patent [19]

Golike et al.

[11] Patent Number: 4,865,902

[45] Date of Patent: Sep. 12, 1989

[54] MULTILAYERED POLYOLEFIN HIGH SHRINKAGE, LOW-SHRINK FORCE SHRINK FILM

[75] Inventors: Ralph C. Golike, Wilmington; Robert W. Thies, Hockessin, both of Del.

[73] Assignee: E. I. Du Pont de Nemours and Company, Wilmington, Del.

[21] Appl. No.: 165,323

[22] Filed: Mar. 8, 1988

Related U.S. Application Data

[63] Continuation-in-part of Ser. No. 819,603, Jan. 17, 1986, abandoned.

[51] Int. Cl.$^4$ .................. B32B 7/02; B32B 27/08; B65B 11/52

[52] U.S. Cl. .................. 428/215; 428/516; 428/520; 428/910; 428/34.9; 264/181; 264/173; 264/171; 264/176.1

[58] Field of Search ............ 428/516, 520, 910, 215, 428/35; 264/171, 173, 181

[56] References Cited

U.S. PATENT DOCUMENTS 4,064,296  12/1977  Bornstein et al. .
4,161,562  7/1979  Yoshikawa et al. .
4,230,767  10/1980  Isaka et al. .................. 428/349
4,541,983  9/1985  Hsu et al. .................. 428/518

FOREIGN PATENT DOCUMENTS 0032027  7/1981  European Pat. Off. .
1605181  2/1983  United Kingdom .

OTHER PUBLICATIONS

AD-5645-Copending Appln.—Golike and Saltman—Films of High Acid Ethylene/Methacrylic Copolymers.

AD-5675-Copending Appln.—Dutton et al.—Process for the Solution Copolymerization of Ethylene with Highly Reactive Comonomers.

Primary Examiner—P. C. Ives

[57] ABSTRACT

A multi-layered, heat shrinkable film is disclosed which possesses one or two outer layers of a polyolefin and a core layer of material having a melting point below the temperature required to orient the material of the outer layer or layers, the core layer comprising 50 to 95% of the overall thickness of the film.

24 Claims, 2 Drawing Sheets

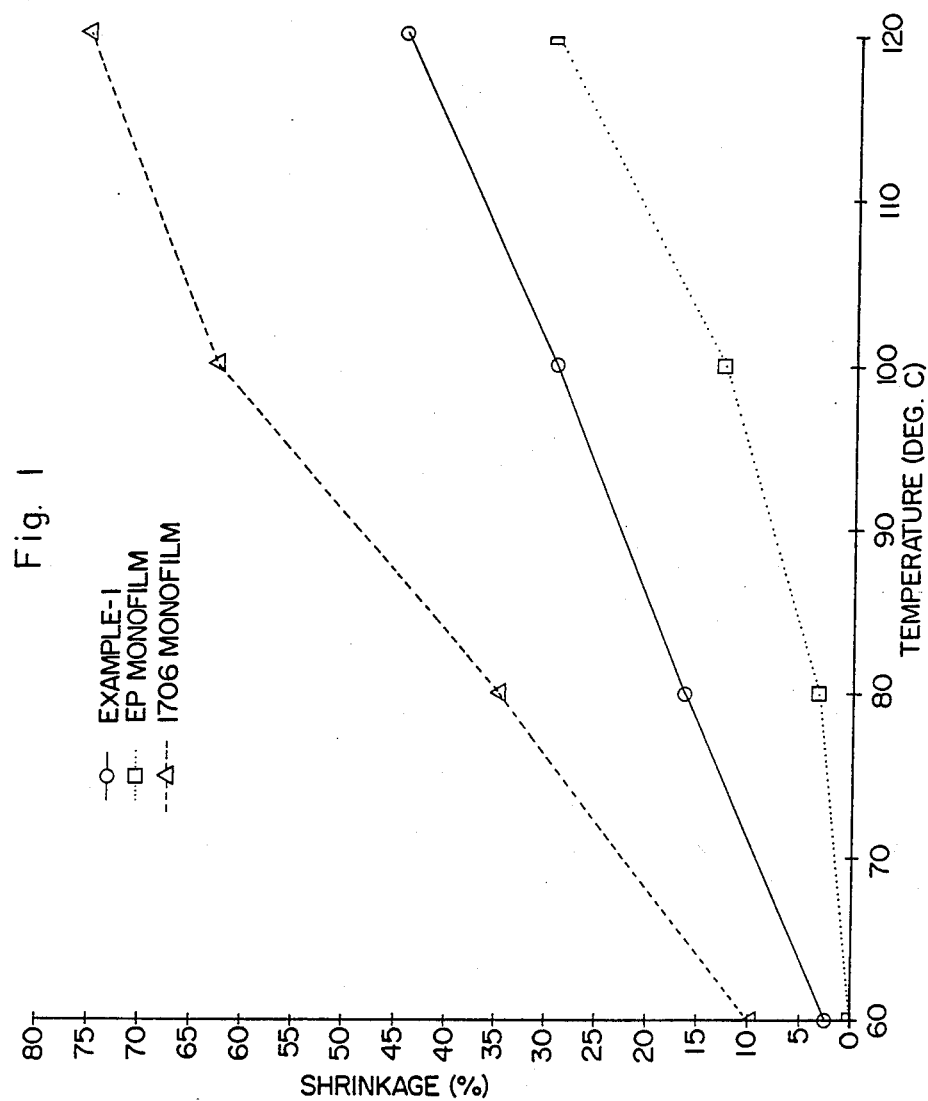

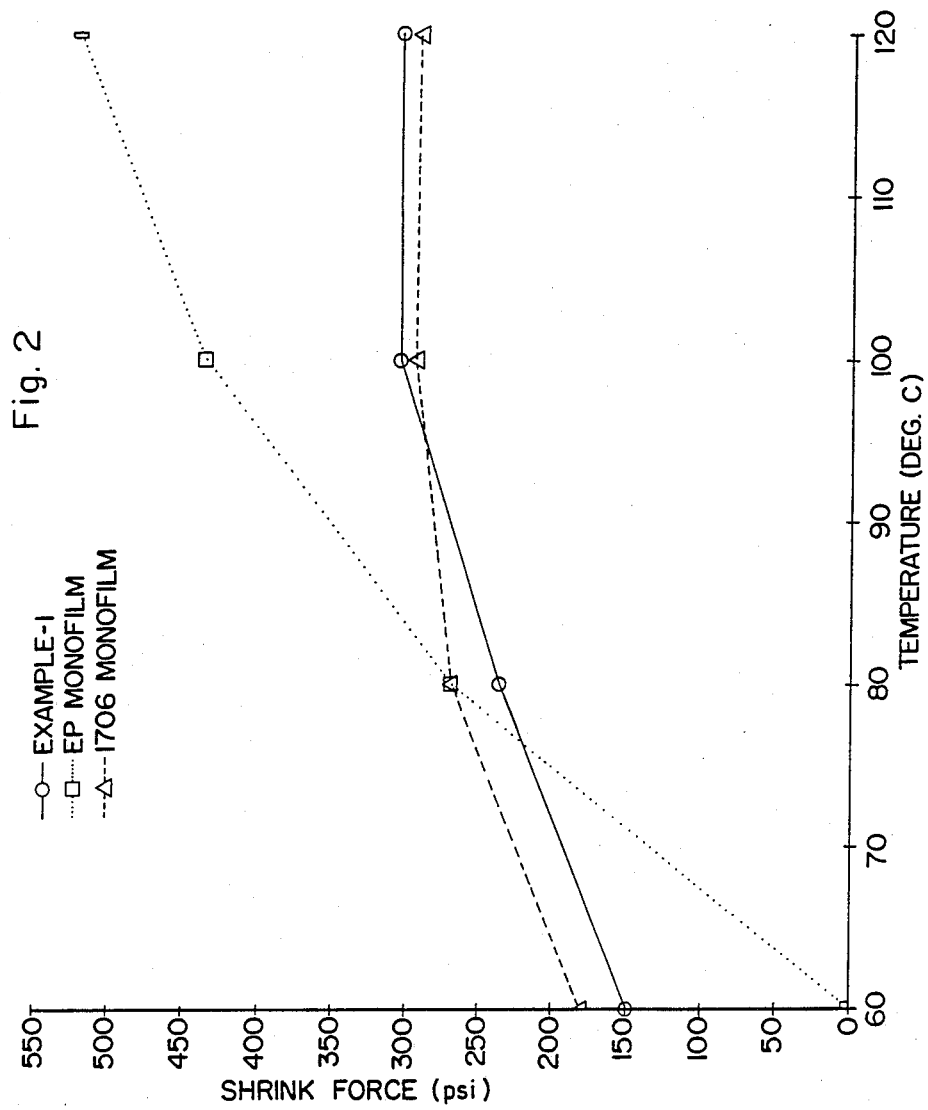

MULTILAYERED POLYOLEFIN HIGH SHRINKAGE, LOW-SHRINK FORCE SHRINK FILM

This patent is a continuation-in-part of application Ser. No. 918,603, filed Jan. 17, 1986, now abandoned.

This invention relates to heat shrinkable, thermoplastic packaging films, to methods for making such films and to packaging materials comprising such films. In particular, it relates to multilayer polyolefin shrink films having high shrinkage and low shrink force.

The polyolefins and polyvinyl chlorides can be considered to be the two major families of plastic resins from which the bulk of commercially available shrink films for wrapping purposes are made. The shrinkable polyolefins currently on the market are mainly monolayer films which include both crosslinked and uncrosslinked oriented polyethylene, oriented polypropylene, and oriented ethylene-propylene copolymers. The polyvinyl chloride (hereinafter "PVC") shrink films are monolayer films consisting of a variety of formulations of polyvinyl chloride.

A shrink film's distinguishing characteristic is its ability upon exposure to some level of heat to shrink or, if restrained, to create shrink tension within the film. This ability is activated by the packager when the wrapped product is passed through a hot air or hot water shrink tunnel. This process causes the film to shrink around the product producing a tight, transparent wrapping that conforms to the contour of the product and which is aesthetically pleasing while providing the useful functions required of packaging materials such as protection of the product from loss of components, pilferage, or damage due to handling and shipment. Typical items wrapped in PVC or polyolefin shrink films are toys, games, sporting goods, stationery, greeting cards, hardware and household products, office supplies and forms, foods, phonograph records, and industrial parts.

The ability of a film to shrink upon exposure to some level of heat arises from the orientation of that film during manufacture. The films are usually heated to their orientation temperature range which varies with the different polymers but is usually above room temperature and below the polymer's melting temperature. The film is then stretched in the cross or transverse direction and in the longitudinal or machine direction to orient it. After being stretched, the film is rapidly cooled to quench it, thus freezing the molecules of the film in their oriented state. Upon heating, the orientation stresses are relaxed and the film will begin to shrink back to its original, unoriented dimension.

The PVC and polyolefin familes of shrink films provide a wide range of physical and performance characteristics. Film characteristics play an important role in the selection of a particular film and may differ for each type of packaging application and for each packager. Consideration must be given to the product's size, weight, shape, rigidity, number of product components, other packaging materials which may be used along with the film and the type of packaging equipment available.

Polyolefins have been most successful with applications where moderate to high shrink forces are preferred and on new, automatic, high speed shrink wrapping equipment where shrink and sealing temperature ranges are more clearly controlled. The polyolefins tend to be cleaner leaving fewer deposits and less residue thereby extending the life of the equipment and reducing equipment maintenance. The PVC films generally have better optics, lower shrink forces, and will seal and shrink over much broader temperature ranges than the polyolefins. A drawback to PVC films, however, is their tendency to emit noxious gases upon heat sealing.

Heretofore, polyolefins have not been able to penetrate PVC film packaging applications where the products to be packaged require the lower shrink forces of the PVC film because the products are too fragile for use with polyolefins which possess shrink forces up to four times those of the PVC films. PVC films are also the shrink film of choice for older, manually operated sealers and semi-automatic wrappers where temperatures are highly variable. Older poorly maintained wrapping equipment of any type usually runs PVC better than present monolayer polyolefins due to the combination of the generally broader shrink and sealing temperature ranges of the PVC films.

Accordingly, it is an object of this invention to provide a shrink polyolefin film that has many of the desirable qualities of PVC films and overcomes the limitations of PVC films.

SUMMARY OF THE INVENTION

A novel multi-layered, heat shrinkable thermoplastic packaging film has now been found which provides the lower shrink forces and wide shrink temperature ranges usually attributed only to PVC-based products while having the advantages of polyolefin-based products; e.g., cleanliness. Specifically, this invention is directed to a heat shrinkable film comprising:

(a) one of two outer layers of material selected from the group consisting of polyethylene, polypropylene, propylene/ethylene copolymers and blends thereof, (b) a core layer of material having a melting point below the temperature required to orient the material of the outer layer or layers, said material being selected form the group consisting of ethylene/acid copolymers and related ionomers; ethylene/acid/acrylate terpolymers and related ionomers; blends of any of the above with up to about 50% ethylene vinyl acetate; blends of ethylene/ester copolymers with up to about 50% ethylene vinyl acetate; and combinations of the above materials, said core layer having a thickness comprising about 50 to 95% of the total thickness of the heat-shrinkable film.

Test results indicate that films of this invention have shrink forces low enough to compare with PVC-based films, have a wide range of shrink temperatures and also possess high shrinkage and excellent optical properties. These films can also be more safely and conveniently handled by the end user than PVC films.

BRIEF DESCRIPTION OF THE FIGURES

FIG. 1 shows a graph of shrinkage data for a film of this invention and comparative films.

FIG. 2 shows a graph of shrink force for a film of this invention and for comparative films.

DETAILED DESCRIPTION

The heat shrinkable films of this invention possess at least two layers of thermoplastic material, one layer termed an outer layer and a second layer termed a core layer. The outer layer is, as its name suggests, situated at an outer surface of the film. The core layer may be adjacent to the outer layer and, in the case of a two-layer film, may be situated at the other opposing outer surface of the film. Alternatively, and preferably, the core layer is sandwiched between two outer layers to form a three-layer film. As will be discussed in greater detail below, additional polymeric layers may be incorporated in the film to impart improved heat seal characteristics to the basic two- or three-layer film. Other polymeric layers which do not significantly affect the heat shrink characteristics of the film may also be incorporated into the film; e.g., layers of barrier materials.

The core layer constitutes about 50 to 95%, and preferably about 60 to 90%, of the thickness of the overall film. The properties desired in the core layer are that it have high strength (to give high drawability without breakage), high shrinkage, have a melting point below the temperature required to orient the material in the outer layer, and preferably, provide good optical properties, including low haze, high clarity and high gloss in the final product. Suitable for this purpose are ethylene/acid copolymers and ionomers, well known in the art to be copolymers of ethylene with an olefinically unsaturated organic acid such as acrylic or methacrylic acid, the acid comprising about 0.5 to 50 mole percent of the total polymeric material. The ethylene/acid copolymers and their method of preparation are well known in the art and are disclosed in, for example, U.S. Pat. Nos. 3,264,272, 3,404,134, 3,355,319 and 4,321,337, the disclosure of which are hereby incorporated by reference. The copolymers are termed ionomers when the acid is neutralized in whole or in part to produce a salt. The cations of said salts are usually alkali metal, zinc or the like. Terpolymers of ethylene, olefinically unsaturated organic acids and an alkyl acrylate or methacrylate termonomer (e.g., n-butyl acrylate or methacrylate or isobutylacrylate or methacrylate), and the corresponding ionomers, are also suitable for use in the core layer.

Particularly preferred core layers are random copolymers of ethylene with methacrylic acid, the proportion of copolymerized methacrylic acid being about 27-42 percent of the copolymer weight, wherein the carboxylic groups of the copolymer are neutralized to an extent of about 0-90% with divalent or trivalent metal ions, the melt index of the copolymer, whether neutralized or unneutralized, being about 0.1 to 30, preferably 0.5 to 20, dg/min, according to ASTM Standard D1238 (condition E). The copolymers of the core layer can also contain lower levels of copolymerized acid, such as 9 to 18 weight percent.

Blends of certain materials are also suitable for use as the core material. In particular, blends of any of the previously mentioned core materials (e.g., ionomers, ethylene/acid copolymers and terpolymers) with up to about 50% ethylene vinyl acetate may be used. Another suitable blend is one of up to about 50% ethylene vinyl acetate with an ethylene/ester copolymer, the ester being an olefinically unsaturated ester such as an alkyl acrylate or alkyl methacrylate. The ethylene vinyl acetate used in these blends generally comprises up to about 40% vinyl acetate. Finally, the core material may comprise any combination of any of the above-mentioned core materials, either in the form of blends in a single layer or in the form of separate and discrete layers.

The outer layer or layers of the film of this invention comprise materials which can be oriented to provide high shrinkage (e.g. 60% at 120° C.), which are oriented at temperatures above the melting point of the core layer, which preferably have good optical properties and a low coefficient of friction. The materials suitable for use in the outer layer are polyethylene (high, medium or linear low density), polypropylene and propylene/ethylene copolymers. The outer layer(s) may also comprise any combination of these materials, either in the form of blends or in the form of separate and discrete layers. When there are two outer layers, they may comprise the same or different materials. These materials may all be oriented by methods known in the art at temperatures (orientation temperatures) generally above 110° C. Slip and anti-block agents which are well known in the art may be added in minor amounts to the material in the outer layer or any layer to reduce its coefficient of friction.

The combined thickness of the outer layers may comprise about 5 to 50% of the thickness of the final film. Preferably, however, the combined thickness of the outer layers does not exceed about 15% of the thickness of the final film. When the thickness of the outer layers exceeds 15%, greater stress is required to orient the film, leading to a film with a higher shrink force.

To improve the heat seal strength of the films of this invention, it may be desirable to incorporate additional layers of adhesive resin capable of increasing the adhesion between the outer layer(s) and the core layer. Suitable materials for this adhesive or tie layer would be known to one skilled in the art and include ethylene vinyl acetate copolymers, ethylene/ester copolymers (e.g., copolymers with olefinically unsaturated esters such as alkyl acrylate or alkyl methacrylate), and anhydride grafted polyolefins (as disclosed, e.g., in U.S. Pat. No. 4,230,830, the disclosure of which is hereby incorporated by reference). The ethylene copolymers preferably have a vinyl acetate or ester content in the range of 9 to 25% as higher vinyl acetate and acrylate contents provide the best adhesion to the outer polyolefin layers. Each tie layer will generally comprise about 1 to 10% of the total thickness of the final film.

Certain films of this invention have been found to be preferred because of a combination of properties including low shrink force, high melt strength at orientation, good tensile and tear strengths and excellent optics. These preferred films comprise at least three layers, a core layer sandwiched between two outer layers and, more preferably, comprise five layers in the sequence outer layer/tie layer/core layer/tie layer/outer layer. In the preferred films the core layer comprises 60 to 90% of the total thickness of the film and comprises ionomers and blends of ionomers, the preferred ionomers being copolymers of ethylene and 9 to 18% methacrylic acid neutralized up to about 60%, or copolymers of ethylene and 27-42% methacrylic acid, neutralized up to about 90%. The preferred films have outer layers comprising about 3 to 7% each of the total thickness of the film and comprising propylene/ethylene copolymers containing 1-4% ethylene. The preferred films have tie layers, the preferred materials in these layers being ethylene methylacrylate or ethylene ethylacrylate containing 20-24% acrylate. Specifically preferred embodiments of this invention include the following film structure:

(a) two outer layers, each comprising 5% of total thickness of the film, and each comprising a propylene-/ethylene copolymer containing 1-4% ethylene (b) a core layer comprising 80% of total thickness of the film and comprising one of the following materials;

(i) a copolymer of ethylene and 15% methacrylic acid which has been neutralized 58%;
(ii) a copolymer of ethylene and 10% methacrylic acid which has been neutralized 54%;
(iii) a copolymer of ethylene and 15% methacrylic acid which has been neutralized 29%;

(c) two tie layers, each comprising 5% of the total thickness of the film and each comprising ethylene/methylacrylate copolymer containing 20–24% methylacrylate monomer.

The films of this invention can be prepared by lamination, or extrusion and orientation methods well known in the art. The preferred method for orienting the films is the well-known "bubble" method. In this method, the film is extruded first as a thick-walled tubular tape, cooled below the melting point of each of the layers, optionally subjected to ionizing radiation, then reheated and oriented as a bubble to form the film. Finally, the film is cooled, the bubble is collapsed and wound up. Orientation of the film by this method is in both the transverse and machine directions. The transverse direction stretch is accomplished by blowing air into the tubing, and machine direction stretch is accomplished by rollers which pull the film upwards. To minimize the final shrink force of the film, it is standard technique to minimize the bubble air pressure (pressure of the air blown into the tubing) and maximize the temperature at which the tubing is reheated. It has been found advantageous to orient the preferred films of this invention by the bubble method using bubble air pressure in the range of about 0.5 to 2" H$_2$O at a maximum temperature of about 135° C. to arrive at heat-shrinkable films with low shrink forces. (This figure for bubble air pressure refers to a 4" line blown to a 20" bubble.) Optimal orienting conditions will, of course, vary with the content of the film. The films of this invention may be used to produce any number of packaging materials. Such packaging materials include heat-shrinkable bags, pouches, discrete sheets of film for wrapping articles, and tubes of film.

Films of this invention and their preparation are illustrated in the following examples. The following two methods were used to prepare the films in these examples, Method 1 being the method used unless otherwise indicated. The abbreviation MD refers to machine direction, and TD refers to transverse direction.

Method 1—Bubble Method

Samples were made by coextruding the materials through a typical coextrusion die with an annular diameter of 4" and a die gap of 35 mils. The extruded tubing was then passed over an internal quenching mandrel which was maintained at 17° C. A typical rate of extrusion was 4.3 ft/minute. The thickness of the quenched tube was 18.3 mils. The tubing was then reheated by means of an internal electric radiant heater, in combination with an external heater, to a temperature below the melting point of the highest melting component. Simultaneously with reheating, the tubing was stretched in both the MD and TD direction. The TD stretch was accomplished by blowing air into the tubing at a pressure of 0.5–5 inches of water. This "bubble air" pressure expanded the tubing to a diameter of 20 inches. The MD stretch was accomplished by differential speed between the lower nip (4.3 ft./min.) and the top nip (15.4 ft./min.). These general conditions produced a 1-mil film which was stretched 3.5×MD and 5.0 TD.

Method 2—Stretch Method

This is a two-step process for making a shrink film. The first step is to cast a thick film on a coextrusion film line with two extruders and a three-layer feeding block to combine the two materials into a three-layer film. A five-layer film is prepared by using three extruders and a mixing block that combines the materials into a five-layer film.

In the case of the propylene-ethylene copolymer-/ionomer/propylene-ethylene copolymer films, the films were cast at 215° C. die temperature from a 12" wide film die onto a double chill roll using an S wrap and collected in roll form on a windup stand. The thickness of the individual layers was controlled by varying the appropriate extruder feed rate. The desired film thickness is approximately 18 mils. This film thickness provides a 1-mil film after being stretched 4×) in both the MD and the TD direction.

The second step is to orient these samples at a temperature below the melting point of the highest melting material in the sample. This biaxial orientation was accomplished on a Long stretcher. Test samples were 4"×4" squares which were stretched 4x in both the MD and TD. Typical stretching conditions were at 125° C. After a 2-minute preheat at this temperature, the sample was stretched at 40,000%/minute. The films were then cooled to room temperature while still under restraint.

The following abbreviations and tradenames are used in the examples. All melt indexes refer to g/10 min. at 190° C. unless otherwise specified.

| | |
|---|---|
| EP | An ethylene/propylene copolymer containing 3–4% ethylene with a melt index of 3.5 g/10 minute at 230° C. |
| EH | Du Pont Clysar ® Shrink Film, blend of high density and low density polyethylene |
| EH806 | Du Pont Clysar ® Shrink Film XEH806, linear low density polyethylene |
| 2050 | Dow linear Low Density Polyethylene 2050 |
| Surlyn ® 1706 | Du Pont ionomer resin Surlyn ® F1706. This is a copolymer of ethylene and 15% methacrylic acid (MAA) which has been neutralized 58% with Zn ions to a melt index of 0.7. |
| Surlyn ® 1652 | Du Pont ionomer resin Surlyn ® 1652. This is a copolymer of ethylene and 9% MAA which has been neutralized 18% with Zn ions to a melt index of 5.0. |
| Surlyn ® 1856 | Du Pont ionomer resin Surlyn ® 1856. This is a terpolymer of ethylene, 10% MAA and 10% isobutylacrylate (IBA) which has been neutralized 36% with Na ions to a melt index of 1.0. |
| Surlyn ® 1557 | Du Pont ionomer resin Surlyn ® 1557. This is a copolymer of ethylene and 11% MAA which has been neutralized 57% with Zn ions to a melt index of 5.0. |
| Surlyn ® 1855 | Du Pont ionomer resin Surlyn ® 1855. This is a terpolymer of ethylene, 10% MAA and 10% isobutylacrylate (IBA) which has been neutralized 73% with Zn ions to a melt index of 1.0. |
| Nurcrel ® 0903 | Du Pont Nucrel ® 0903 acid copolymer. This is a copolymer of ethylene and methacrylic acid, 9% acid, with a melt index of 2.5. |
| Elvax ® 3190 | An ethylene vinyl acetate copolymer containing 25% vinyl acetate and having a melt index of 2.0. |
| Elvax ® 3165 | An ethylene vinyl acetate copolymer containing 18% vinyl acetate and having a melt index of 0.7. |

-continued

| | |
|---|---|
| Elvax ® 3130 | An ethylene vinyl acetate copolymer containing 12% vinyl acetate and having a melt index of 2.5. |

The following standard tests are also referred to in the examples:

Modulus, Tensile Strength, and Elongation: ASTM D882
Coefficient of Friction: ASTM D1894
Elmendorf Tear (Elm. Tear): ASTM D1922
Haze: ASTM D1003
Clarity: ASTM D1746
Gloss: ASTM D2457
Shrink Force: ASTM D2838 (Use herein of the term "Shrink Force" refers to "Shrink Tension" as defined by ASTM D2838)
Shrinkage: ASTM D2732

EXAMPLE 1

A three-layer film made by Method 1 was prepared, the core layer being Surlyn ® 1706 ionomer resin and the outer layers being EP. The relative thickness ratios were 1:8:1. A graph of the shrinkage and shrink force data for this three-layer film along with data for monofilms made of 100% EP and 100% Surlyn ® 1706 resin are found in FIGS. 1 and 2, respectively. It can be seen that although the percent shrinkage for the three-layer film is between that of EP and Surlyn ® 1706 resin, its shrink force is substantially the same as that of Surlyn ® 1706 rein.

EXAMPLES 2, 3, 4

In Example 2, a five-layer film was prepared via Method 1. The core layer was Surlyn ® 1706 which was bounded on each side by a layer of Elvax ® 3190. Bonded to each layer of Elvax ® 3190 was a layer of EP. The relative thickness ratios were 1:1:16:1:1. The bubble air pressure was 1" water.

Examples 3 and 4 are identical to Example 2 except that the bubble air pressure was changed to 3" and 4.5" of water, respectively. The shrinkage and shrink force for these three examples are presented in Table 1. It is apparent from these data that the shrink force can be dramatically changed by the amount of air pressure used to orient the bubble.

TABLE 1
SHRINKAGE & SHRINK FORCE DATA FOR EXAMPLES 2, 3, 4

| Temp °C. | % Shrinkage | | | Shrink Force (psi) | | |
|---|---|---|---|---|---|---|
| | EX 2 | EX 3 | EX 4 | EX 2 | EX 3 | X 4 |
| 60 | 2 | 8 | 9 | 108 | 181 | 190 |
| 80 | 12 | 19 | 20 | 154 | 219 | 210 |
| 100 | 30 | 41 | 38 | 152 | 238 | 227 |
| 120 | 40 | 48 | 47 | 162 | 271 | 236 |

EXAMPLES 5, 6

These samples are similar to that of Example 1 with changes in the relative layer thicknesses. Example 5 has the relative thickness ratios of 1:18:1 and Example 6 has the relative thickness ratios of 1:3:1. The shrinkage and shrink force data for these two examples and that for Example 1 are in Tables 2A and 2B. Additional data for the three films are in Table 2C.

TABLE 2A

Shrinkage Data

| Example | Thickness of Layers % | % of Shrinkage at: | | | |
|---|---|---|---|---|---|
| | | 60° C. | 80° C. | 100° C. | 120° C. |
| 1 | 10/80/10 | 2.5 | 16.5 | 29.5 | 45 |
| 5 | 5/90/5 | 3.0 | 28.0 | 59.0 | 64 |
| 6 | 20/60/20 | 5.0 | 13.0 | 24.0 | 42 |

TABLE 2B

Shrink Force Data

| Example | Thickness of Layers % | Shrink Force (psi) at: | | | |
|---|---|---|---|---|---|
| | | 60° C. | 80° C. | 100° C. | 120° C. |
| 1 | 10/80/10 | 149 | 236 | 305 | 306 |
| 5 | 5/90/5 | 183 | 194 | 263 | 238 |
| 6 | 20/60/20 | 205 | 236 | 317 | 314 |

TABLE 2C

| Example | Elm. Tear g/mil Avg. | Modulus Kpsi Avg. | Tensile Strength Kpsi Avg. | Elong % Avg. |
|---|---|---|---|---|
| 1 | 12.5 | 60 | 8.0 | 102 |
| 5 | | 64 | 7.6 | 92 |
| 6 | | 92 | 10.3 | 117 |

| | Haze % | Clarity % | Gloss % | Seal Strength (g/inch) |
|---|---|---|---|---|
| 1 | 1.6 | 75 | 79 | 490 |
| 5 | 0.9 | 80 | 127 | |
| 6 | 1.3 | 79 | 143 | |

EXAMPLES 7, 8, 9, 10, 11

Examples 7-11 are three-layer films prepared via Method 2. In each case, the outer layers of the film were EP and each example used a different Surlyn ® ionomer resin. The samples were stretched at 125° C.

| Example | Core Layer |
|---|---|
| 7 | Surlyn ® 1706 |
| 8 | Surlyn ® 1652 |
| 9 | Surlyn ® 1856 |
| 10 | Surlyn ® 1557 |
| 11 | Surlyn ® 1855 |

The shrinkage and shrink force data are presented in Tables 3A and 3B, respectively. It can be readily seen here that these various ionomer core layers provide similar shrinkage and shrink force properties when processed in the same manner. Their physical properties, however, can vary greatly as can be seen in the summary presented in Table 3C.

TABLE 3A

Shrinkage Data

| Example | % Shrinkage at | | |
|---|---|---|---|
| | 80° C. | 100° C. | 120 C. |
| 7 | 2.9 | 8.2 | 19.6 |
| 8 | 3.0 | 8.8 | 23.2 |
| 9 | 3.4 | 23.4 | 31.9 |
| 10 | 3.2 | 8.2 | 20.7 |
| 11 | 3.4 | 19.7 | 33.7 |

TABLE 3B

Shrink Force Data

| Example | Shrink Force (psi) at: | | |
|---|---|---|---|
| | 80° C. | 100° C. | 120° C. |
| 7 | 55 | 60 | 65 |

TABLE 3B-continued

Shrink Force Data

| Example | Shrink Force (psi) at: 80° C. | 100° C. | 120° C. |
|---|---|---|---|
| 8 | 29 | 50 | 70 |
| 9 | 29 | 51 | 67 |
| 10 | 36 | 48 | 53 |
| 11 | 31 | 50 | 56 |

TABLE 3C

| Example | Haze % | Clarity % | Gloss % | Thick Avg. (mil) | Modulus Kpsi Avg. |
|---|---|---|---|---|---|
| 7 | 1.11 | 76.1 | 0.83 | 1.29 | 63.7 |
| 8 | 0.89 | 55.2 | 0.53 | 1.08 | 30.0 |
| 9 | 0.96 | 27.0 | 0.60 | 0.99 | 17.4 |
| 10 | 0.82 | 43.1 | 0.70 | 0.67 | 39.8 |
| 11 | 1.07 | 80.3 | 0.84 | 0.95 | 22.8 |

| Example | Tensile Str. Kpsi. Avg. | Elong. % Avg. | Elm. Tear Avg. g/mil |
|---|---|---|---|
| 7 | 4.62 | 107 | 6.5 |
| 8 | 2.69 | 57 | 14.3 |
| 9 | 3.40 | 178 | 20.9 |
| 10 | 2.97 | 40 | 15.4 |
| 11 | 3.99 | 132 | 3.6 |

EXAMPLES 12, 13, 14

Examples 12–14 show the effect of the vinyl acetate content in the ethylene/vinyl acetate tie layer on the heat seal strength of the five-layer compositions. These five-layer films were made using Method 2. The general composition of these films was:
EP:EVA:Surlyn ® 1706:EVA:EP.
The three examples differ only in the vinyl acetate content of the EVA. The heat seal strengths of these samples were measured and compared against a three-layer film (Example 7). The results are presented in Table 4.

TABLE 4

| Example | Elvax ® | % VAc | Heat Seal Strength (g/inch) |
|---|---|---|---|
| 12 | 3190 | 25 | 1400 |
| 13 | 3165 | 18 | 1250 |
| 14 | 3130 | 12 | 800 |
| 7 | None | 0 | 150 |

EXAMPLES 15–25

Examples 15–25 were all prepared using Method 1. They are all three-layer films. The composition of each example, the relative layer thicknesses, and the resulting properties are presented in Tables 5, 6, 7. Table 4 shows the shrink force for each example at 80°, 100° and 120° C. Table 6 shows the % shrinkage for each example at 80°, 100° and 120° C. Table 7 shows other pertinent information on these examples.

In the tables, the following nomenclature is used:

```
806 - EH806
1706 = Surlyn ® 1706
1652 = Surlyn ® 1652
0903 = Nucrel ® 0903
```

A composition designation such as 806/1706/806 means a three-layer film having two outer layers of EH806 and a core layer of Surlyn ® 1706. The designation such as 10/80/10 under "Layer Thickness" indicates that the two outer layers comprise 10% each of the total thickness of the film and the core layer comprises 80%.

TABLE 5

Shrink Force

| Exam. | Composition | Layer Thickness | Shrink Force (psi) at 80° C. | 100° C. | 120° C. |
|---|---|---|---|---|---|
| 15 | 806/1706/806 | 10/80/10 | 70.5 | 79.0 | 63.0 |
| 16 | 806/1706/806 | 5/90/5 | 119.0 | 149.0 | 123.0 |
| 17 | EH/1706/EH | 10/80/10 | 117.0 | 118.0 | 141.5 |
| 18 | EH/1706/EH | 5/90/5 | 144.5 | 161.5 | 153.0 |
| 19 | 2050/1706/2050 | 20/60/20 | 243.5 | 287.5 | 264.0 |
| 20 | 2050/1706/2050 | 10/80/10 | 227.5 | 221.0 | 230.5 |
| 21 | EP/1706+1652/EP* | 10/80/10 | 95.5 | 156.5 | 160.0 |
| 22 | EP/1706+1652/EP* | 5/90/5 | 117.0 | 121.5 | 123.0 |
| 23 | EP/0903/EP | 10/80/10 | 144.5 | 196.5 | 228.0 |
| 24 | EP/1706+0903/EP* | 10/80/10 | 222.5 | 186.0 | 192.5 |
| 25 | EP/1652/EP | 20/60/20 | 165.0 | 194.5 | 279.0 |

*In Examples 21, 22 and 24, the core layer is a 50/50 blend.

TABLE 6

% Shrinkage

| Exam. | Composition | Layer Thickness | % Shrinkage at: 80° C. | 100° C. | 120° C. |
|---|---|---|---|---|---|
| 15 | 806/1706/806 | 10/80/10 | 5.0 | 8.0 | 26.5 |
| 16 | 806/1706/806 | 5/90/5 | 13.5 | 33.0 | 52.5 |
| 17 | EH/1706/EH | 10/80/10 | 13.0 | 37.5 | 50.0 |
| 18 | EH/1706/EH | 5/90/5 | 13.0 | 36.5 | 50.0 |
| 19 | 2050/1706/2050 | 20/60/20 | 12.0 | 28.5 | 61.5 |
| 20 | 2050/1706/2050 | 10/80/10 | 21.0 | 41.0 | 61.5 |
| 21 | EP/1706+1652/EP | 10/80/10 | 8.0 | 18.5 | 36.5 |
| 22 | EP/1706+1652/EP | 5/90/5 | 11.0 | 34.5 | 44.5 |
| 23 | EP/0903/EP | 10/80/10 | 7.0 | 20.0 | 3.0 |
| 24 | EP/1706+0903/EP | 10/80/10 | 8.5 | 24.0 | 44.0 |
| 25 | EP/1652/EP | 20/60/20 | 5.0 | 18.5 | 35.5 |

TABLE 7

| Example | Composition | Layer Thickness | % Haze | % Gloss | % Clarity | Seal Strength (g/in.) |
|---|---|---|---|---|---|---|
| 15 | 806/1706/806 | 10/80/10 | 14.0 | 40 | 56 | 950 |
| 16 | 806/1706/806 | 5/90/5 | 2.5 | 42 | 48 | 375 |
| 17 | EH/1706/EH | 10/80/10 | 3.0 | 83 | 56 | 350 |
| 18 | EH/1706/EH | 5/90/5 | 3.0 | 89 | 45 | 125 |
| 19 | 2050/1706/2050 | 20/60/20 | | | | 2200 |
| 20 | 2050/1706/2050 | 10/80/10 | | | | 875 |
| 21 | EP/1706+1652/EP | 10/80/10 | 2.6 | 100 | 70 | 375 |
| 22 | EP/1706+1652/EP | 5/90/5 | 1.8 | 100 | 73 | 100 |
| 23 | EP/0903/EP | 10/80/10 | 1.8 | 71 | 17 | 425 |
| 24 | EP/1706+0903/EP | 10/80/10 | 2.2 | 100 | 71 | 350 |
| 25 | EP/1652/EP | 20/60/20 | 3.5 | 100 | 49 | 1175 |

EXAMPLE 26

Example 26 is a two-layer film prepared via Method 1. The two layers were EP and Surlyn ® 1706. The film was coextruded such that the EP was on the inside of the bubble, and the relative layer thicknesses were EP 10%, Surlyn ® 1706 90%. The shrinkage and shrink force data are presented in Table 8.

TABLE 8

| Temperature (°C.) | % Shrinkage | Shrink Force (psi) |
| --- | --- | --- |
| 60 | 2.5 | 50 |
| 80 | 14 | 105 |
| 100 | 31.5 | 120 |
| 120 | 47 | 115 |

EXAMPLE 27

The film of Example 1 was stretched again in the machine direction by a Marshall and Williams film stretcher. The film traveled around a 45 cm diameter roll maintained at 82° C. and then passed over a second heated roll 20 cm in diameter and maintained at 130° C. The tangential linear speed of the first two rolls was 6.1 m/minute. Upon leaving the second roll, the film was stretched 2× by a third roll having a diameter of 20 cm, a tangential speed of 12.2 m/minute and a maintained temperature of 82° C. The film was further quenched by contacting a fourth roll 35 cm in diameter, which was moving at a tangential speed of 11.6 m/minute and a controlled temperature of 40° C.

The resulting film had excellent shrink properties MD but TD shrinkage and shrink force were reduced to approximately 25% of the prestretched sample. The shrinkage and shrink force data are provided in Tables 8A and 8B.

TABLE 8A

Shrinkage Data

| | % Shrinkage at | | |
| --- | --- | --- | --- |
| Example | 80° C. | 100° C. | 120° C. |
| 27-MD | 16 | 37 | 50 |
| 27-TD | 2 | 6 | 21 |

TABLE 8B

Shrink Force Data

| | Shrink Force (psi) at | | |
| --- | --- | --- | --- |
| Example | 80° C. | 100° C. | 120° C. |
| 27-MD | 280 | 360 | 470 |
| 27-TD | 0 | 45 | 70 |

EXAMPLE 28

A five-layer film was prepared by Method 1. The core layer was Surlyn ® 1706 which was bonded on each side by a tie layer of ethylene methylacrylate copolymer containing 24% methylacrylate. Bonded to each tie layer was a layer of EP. The relative thicknesses of the layers were 5/5/80/5/5. Data for the film are provided in Table 9.

TABLE 9

| Physical Properties | |
| --- | --- |
| Shrink Force | 165 at 80° C. |
| | 158 at 100° C. |
| | 147 at 120° C. |
| Shrinkage | 12 at 80° C. |
| | 30 at 100° C. |
| | 41 at 120° C. |
| Tensile Strength | 5.9 Kpsi |
| Elongation | 120% |
| Modulus | 67.5 Kpsi |
| Elmendorf Tear | 3.6 g/mil |
| Haze | 1.2% |
| Clarity | 66% |
| Gloss | 100+ |

EXAMPLE 20

A five-layer film was prepared by method 1. The tubing was extruded at a rate of 13 feet/min. and reheated using an external heater consisting of calrod elements surrounding the tube, and an internal heater consisting of a solid heating element. Bubble pressure was 3.9 inches of water. The machine direction speed of the stretched film was 45.5 feet/min. for a stretch ratio of 3.5/1. TD stretch was 5.0/1. The composition of the outside layers was 100% ethylene propylene copolymer containing 500 ppm erucamide, 500 ppm White Mist silica (Manville Co.) and 2500 ppm OX-50 silica (Degaussa Co.). The adhesive layers were a blend of 50% ethylene methyl acrylate copolymer (Chevron 2205) and 50% ultra low density polyethylene (Attane 4001, Dow Chemical). The core layer was ethylene/methacrylic acid copolymer containing 30 weight % MAA and 13% neutralized with zinc. The ratio of the layers was 8/5.5/73/5.5/8.

Physical properties of the film was given in Table 10.

TABLE 10

| Haze % | Gloss % | Clarity % | Coeff. Friction | | Shrinkage, 100° C., % | |
| --- | --- | --- | --- | --- | --- | --- |
| | | | Inside | Outside | MD | TD |
| 1.5 | 96 | 29 | .53 | .70 | 17 | 19 |

| Shrink Force 100° C., psi | | Heat Seal Strength g/inch | | Modulus, Kpsi | |
| --- | --- | --- | --- | --- | --- |
| MD | TD | MD | TD | MD | TD |
| 100 | 130 | 1710 | 970 | 102 | 108 |

EXAMPLE 30

A five-layer film was prepared as in Example 29, except that the core layer was ethylene/methacrylic acid copolymer containing 15% weight percent MAA and 30% neutralized with sodium, and the adhesive layer is ethylene methyl acrylate copolymer (Chevron 2205). The ratio of layers was 10/5.5/69/5.5/10 and the total film thickness was 1.10 mils. Physical properties of the film are given in Table 11.

TABLE 11

| | | | Coeff. Friction | | Shrinkage 100° C., % | |
| --- | --- | --- | --- | --- | --- | --- |
| Haze % | Gloss % | Clarity % | Inside | Outside | MD | TD |
| 1.2 | 124 | 66 | 0.49 | 0.60 | 17 | 20 |

| Shrink Force 100° C., psi | | Heat Seal Str., g/inch | Modulus, Kpsi | |
| --- | --- | --- | --- | --- |
| MD | TD | (avg. of MD + TD) | MD | TD |
| 130 | 200 | 1890 | 81 | 86 |

EXAMPLE 31

A five-layer film was prepared as in Example 29. The adhesive layers were the same as in Example 29. The core layer was the same as in Example 30. The outside layers were a blend of 10% polypropylene homopolymer, 2% LLDPE and 88% E/P copolymer containing 400 ppm erucamide, 1000 ppm N-oleylpalmitamide, 1450 ppm white mist silica and 2200 ppm OX-50 silica. The ratio of layers was 9/6/70/6/9 and the total film thickness was 1.10 mils. Film properties are given in Table 12.

TABLE 12

| Haze % | Gloss % | Clarity % | Coeff. Friction | | Shrinkage, 100° C., % | |
|---|---|---|---|---|---|---|
| | | | Inside | Outside | MD | TD |
| 1.8 | 106 | 39 | 0.42 | 0.43 | 18 | 21 |

| Shrink Force 100° C., psi | | Heat Seal Strength g/inch | | Modulus, Kpsi | |
|---|---|---|---|---|---|
| MD | TD | MD | TD | MD | TD |
| 160 | 190 | 1915 | 2085 | 78 | 85 |

We claim:

1. A multi-layer, heat shrinkable film comprising:
   (a) two outer layers of material selected from the group consisting of polyethylene, polypropylene, propylene/ethylene copolymers and blends thereof,
   (b) a core layer of material having a melting point below the temperature required to orient the material of the outer layer or layers, said core layer consisting essentially of a material selected from the group consisting of ethylene/acid copolymers and related ionomers; ethylene/acid/acrylate terpolymers and related ionomers; and combinations of the above materials, said core layer having a thickness comprising about 50 to 95% of the total thickness of the heat-shrinkable film, said multilayer heat shrinkable film having been uniformly oriented at a temperature above the melting point of the core layer.

2. The film of claim 1 where the outer layer is a propylene/ethylene copolymer.

3. The film of claim 2 where the propylene/ethylene copolymer contains about 1 to 4% ethylene.

4. The film of claim 1 wherein the core layer consists essentially of a material selected from copolymers of ethylene and acrylic acid or methacrylic acid, and corresponding ionomers; terpolymers of ethylene, acrylic acid or methacrylic acid, and an alkyl acrylate or methacrylate, and corresponding ionomers; or any combination thereof.

5. The film of claim 4 where the core layer is an ionomer or blend of ionomers.

6. The film of claim 5 where the core layer is a copolymer of ethylene and 9 to 18 weight percent methacrylic acid neutralized up to about 60%.

7. The film of claim 5 wherein the core layer is a copolymer of ethylene and about 27 to about 42 weight percent methacrylic acid neutralized up to about 90%.

8. The film of claim 4 where the outer layer is a propylene/ethylene copolymer.

9. The film of claim 1 where the outer layer is a propylene/ethylene copolymer containing about 1 to 4% ethylene and the core layer is a copolymer of ethylene and 9 to 18% methacrylic acid neutralized up to about 60%.

10. The film of claim 1 where the outer layer is a propylene/ethylene copolymer containing about 1 to 4% ethylene and the core layer is a copolymer of ethylene and about 27 to about 42 weight percent methacrylic acid neutralized up to about 90%.

11. The film of claim 1 where the core layer comprises about 60 to 90% of the total thickness of the film.

12. The film of claim 1 which has a layer of adhesive resin between the outer layer and the core layer capable of increasing the adhesion between the outer layer and the core layer.

13. The film of claim 12 where the adhesive resin is selected from ethylene vinyl acetate copolymers, ethylene/ester copolymers and anhydride grafted polyolefins.

14. The film of claim 13 where the adhesive resin is a copolymer of ethylene with methyl acrylate.

15. The film of claim 14 where the adhesive resin is a copolymer of ethylene with about 20 to 24% methyl acrylate.

16. The film of claim 15 where the core layer is a copolymer of ethylene and about 15% methacrylic acid which has been neutralized about 58%.

17. The film of claim 15 where the core layer is a copolymer of ethylene and about 10% methacrylic acid which has been neutralized about 54%.

18. The film of claim 15 where the core layer is a copolymer of ethylene and about 15% methacrylic acid which has been neutralized about 29%.

19. The film of claim 16 where each of the outer layers and each of the layers of adhesive resin comprise about 5% of the total thickness of the film.

20. The film of claim 17 where each of the outer layers and each of the layers of adhesive resin comprise about 5% of the total thickness of the film.

21. The film of claim 18 where each of the outer layers and each of the layers of adhesive resin comprise about 5% of the total thickness of the film.

22. A multilayer, heat-shrinkable film comprising:
   (a) two outer layers of a blend of propylene/ethylene copolymer, polypropylene homopolymer, and linear low density polyethylene;
   (b) a core layer of ethylene/methacrylic acid copolymer containing about 15 weight percent copolymerized methacrylic acid, neutralized about 30% with sodium; and
   (c) two adhesive layers of a blend of ethylene methyl acrylate copolymer and ultra low density polyethylene.

23. A packaging material comprising a film according to claim 1.

24. A method of making a heat-shrinkable film of claim 1 comprising uniformly stretching a multi-layer film comprising said outer layers and said core layer at a temperature at or above the orientation temperature of the material in said outer layers but below the melting temperature of said materials.

* * * * *